United States Patent
Matsumoto

(10) Patent No.: US 6,918,420 B2
(45) Date of Patent: Jul. 19, 2005

(54) PNEUMATIC TIRE INCLUDING GROOVE BOTTOM RIB

(75) Inventor: Tadao Matsumoto, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 10/014,589

(22) Filed: Dec. 14, 2001

(65) Prior Publication Data

US 2002/0112801 A1 Aug. 22, 2002

(30) Foreign Application Priority Data

Dec. 19, 2000 (JP) ........................................ 2000-385730

(51) Int. Cl.⁷ ...................... B60C 11/13; B60C 101/00; B60C 111/00
(52) U.S. Cl. ............... 152/209.8; 152/209.19; 152/209.22; 152/209.26
(58) Field of Search ................ 152/209.8, 209.15, 152/209.19, 209.22, 209.26

(56) References Cited

U.S. PATENT DOCUMENTS

| | | | |
|---|---|---|---|
| 2,268,344 A | * | 12/1941 | Shesterkin |
| 4,687,037 A | | 8/1987 | Pfeiffer et al. |
| 5,503,206 A | * | 4/1996 | Consolacion et al. |
| 6,112,788 A | * | 9/2000 | Ikeda |
| 6,505,661 B1 | * | 1/2003 | Nakagawa et al. |
| 2001/0032691 A1 | * | 10/2001 | Ohsawa |

FOREIGN PATENT DOCUMENTS

| | | | |
|---|---|---|---|
| EP | 646480 | * | 4/1995 |
| EP | 710577 | * | 5/1996 |
| EP | 0 908 330 A1 | | 4/1999 |
| JP | 2-179508 | * | 7/1990 |
| JP | 8-150812 | | 6/1996 |
| JP | 2001-55012 | * | 2/2001 |
| WO | WO 95/18022 | * | 7/1995 |

* cited by examiner

Primary Examiner—Steven D. Maki
(74) Attorney, Agent, or Firm—Birch, Stewart, Kolasch & Birch, LLP

(57) ABSTRACT

A pneumatic tire comprises a tread portion provided with at least one wide circumferential groove, the wide circumferential groove extending continuously in the tire circumferential direction and having a groove width GW of not less than 5% of the ground contacting width TW, the wide circumferential groove provided in the groove bottom with a groove bottom rib, the groove bottom rib extending continuously along the overall length of the wide circumferential groove, the groove bottom rib having a height Hr in a range of from 0.5 to 3.0 mm and a base width Wr in a range of from 10 to 30% of the groove width GW, and the groove bottom rib provided in the top face with a small groove having a depth Dr of less than the height Hr.

16 Claims, 5 Drawing Sheets

PNEUMATIC TIRE INCLUDING GROOVE BOTTOM RIB

The present invention relates to a pneumatic tire, more particularly to a tread structure being capable of suppressing air resonance in a wide circumferential groove.

In a pneumatic tire having a wide circumferential groove especially a substantially straight groove, the wide circumferential groove forms an open-ended air tube between the tire and the road surface in the ground contacting patch of the tire. Such tube is liable to resonate during running. If the resonance occurs with the fundamental frequency around 1000 Hz to which human ears are most sensitive, then the tire running noise is increased. The occurrence of such a resonance may be prevented if the groove width is decreased. But the main purpose of the wide groove, namely, enhanced drainage can not be achieved.

It is therefore, an object of the present invention to provide a pneumatic tire in which tire noise due to air tube resonance is reduced without deteriorating wet performance.

According to the present invention, a pneumatic tire comprises a tread portion provided with at least one wide circumferential groove, the wide circumferential groove extending continuously in the tire circumferential direction and having a groove width GW of not less than 5% of the ground contacting width TW, the wide circumferential groove provided in the groove bottom with a groove bottom rib, the groove bottom rib extending continuously along the overall length of the wide circumferential groove, the groove bottom rib having a height Hr in a range of from 0.5 to 3.0 mm and a base width Wr in a range of from 10 to 30% of the groove width GW, and the groove bottom rib provided in the top face with a small groove having a depth Dr of less than the height Hr.

Embodiments of the present invention will now be described in detail in conjunction with the accompanying drawings.

According to the present invention, a pneumatic tire comprises a tread portion 1, a pair of axially spaced bead portions, a pair of sidewall portions, a carcass extending between the bead portions, and a tread reinforcing belt disposed radially outside the crown portion of the carcass as usual.

In this embodiment, the pneumatic tire is a radial tire for recreational vehicles such as minivan.

Figure 1:
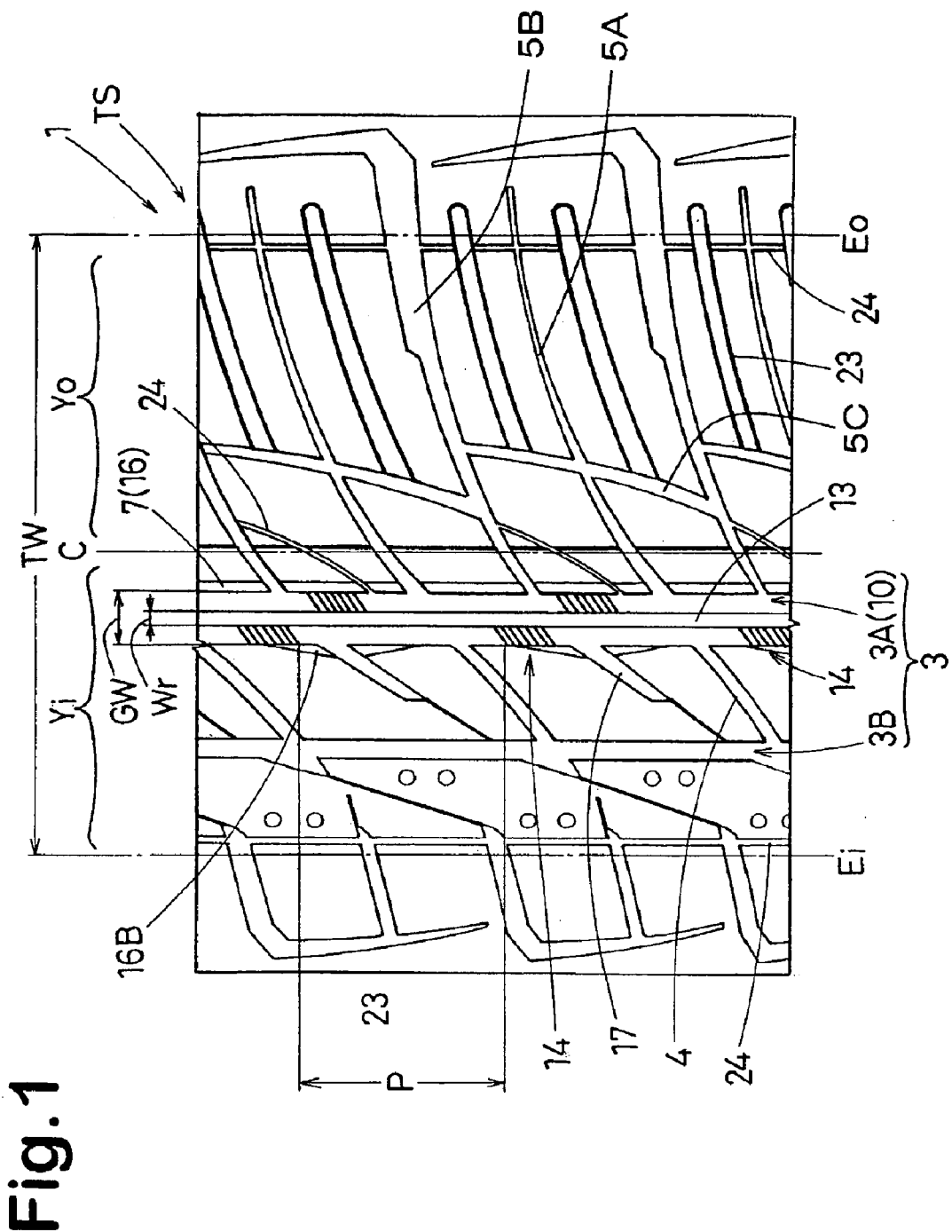
FIG. 1 is a developed plan view of a pneumatic tire according to the present invention.

In FIG. 1, an outside half Yo of the tread portion 1 between the tire equator C and an outside tread edge Eo and an inside half Yi of the tread portion 1 between the tire equator C and an inside tread edges Ei are provided with different tread patterns. Here, the "outside" and "inside" are used to mean the designed use of the tire in which the outside half Yo and inside half Yi are positioned on the outside and inside of the vehicle, respectively. Further, the tread groove arrangement forms a directionally bound tread pattern.

Here, the above-mentioned tread edges Ei and Eo are the axial edges of the ground contacting region Ts under a standard loaded condition in which the tire is mounted on a standard rim and inflated to a standard load and then loaded with a standard load. The standard rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various cold Inflation Pressures" table in TRA or the like. The standard load is the "maximum load capacity" in JATMA, the "Load capacity" in ETRTO, the maximum value given in the above-mentioned table in TRA or the like. The tread width TW is defined as the axial distance between the tread edge Ei and Eo.

In FIG. 1, the inside tread half Yi is provided with a wide circumferential groove 3A near the tire equator C, and a narrow circumferential groove 3B on the inside tread edge Ei side thereof. The circumferential grooves 3A and 3B are formed as a substantially straight groove to provide a good drainage to improve wet performance.

Such circumferential grooves 3A, 3B are not provided in the outside tread half Yo.

Between the circumferential grooves 3A and 3B, lateral grooves 4 are disposed so as to form a circumferential row of blocks. The lateral grooves 4 are inclined in the same direction and slightly curved. Thus, the block shape is generally a parallelogram in which the circumferential length is greater than the axial width.

The part between the circumferential groove 3B and the inside tread edge Ei forms a circumferentially continuous rib.

On the other hand, the outside tread half Yo is crossed by lateral grooves 5A and 5B extending from the wide circumferential groove 3A to the outside tread edge Eo, wherein the groove 5A gradually narrows towards the outside tread edge Eo, and the groove 5B gradually widens towards the outside tread edge Eo, and they are arranged alternately in the tire circumferential direction. The lateral grooves 5A and 5B are inclined in the same direction and slightly curved. The inclination is the same as the lateral grooves 4 but the curvature is reversed. The lateral grooves 5A are aligned with the lateral grooves 4.

Further, the outside tread half Yo is provided with longitudinal grooves 5C each extending from one of the widening lateral grooves 5B to the adjacent widening lateral groove 5B across one of the narrowing lateral grooves 5A, while slightly inclining one direction with respect to the tire circumferential direction. The inclining direction is the same as those of the lateral grooves 4, 5A and 5B. The outside tread half Yo is divided into blocks being substantially a quadrilateral such that the axial width is larger than the circumferential length.

The above-mentioned circumferential grooves 3A and 3B and lateral grooves 4, 5A and 5B and longitudinal grooves 5C are each defined as having a width of more than 2.5 mm.

Near the inside and outside tread edges Ei and Eo, a circumferentially extending groove 24 which is shallow and fine and thus does not have the function of drainage, is disposed. These fine shallow grooves 24 extend straight and have a width of not more than 2.5 mm and a depth of lass than 5 mm, whereby the wandering performance, uneven shoulder wear and the like may be improved.

Therefore, the inside tread half Yi serves drainage from the tread center, and the outside tread half Yo serves the lateral stiffness (rigidity) of the tread portion. Thus, the tread pattern as a whole can improve the wet performance and steering stability at the same time.

According to the present invention, in the above-mentioned ground contacting region Ts between the tread edges Ei and Eo, there is disposed at least one wide circumferential groove 10 having a groove width GW in a range of not less than 5%, preferably not less than 7% of the ground contacting width TW between the tread edges Ei and Eo.

In this embodiment, the above-mentioned circumferential groove 3A is the wide circumferential groove 10. The width of the narrow circumferential groove 3B is about one third of the wide circumferential groove 3A.

Figure 2:
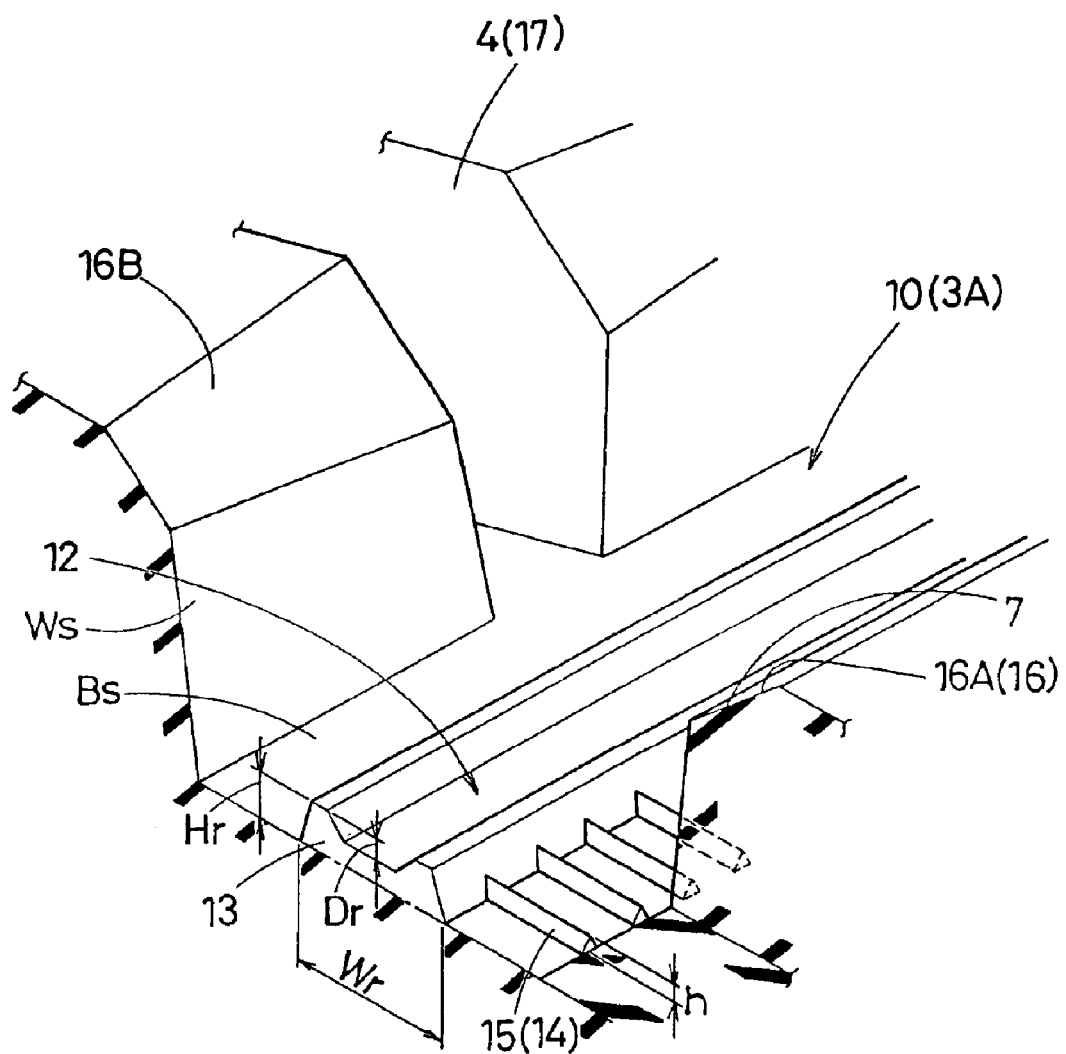
FIG. 2 is an enlarged perspective view of a wide circumferential groove showing an example of the groove bottom rib.
Figure 3:
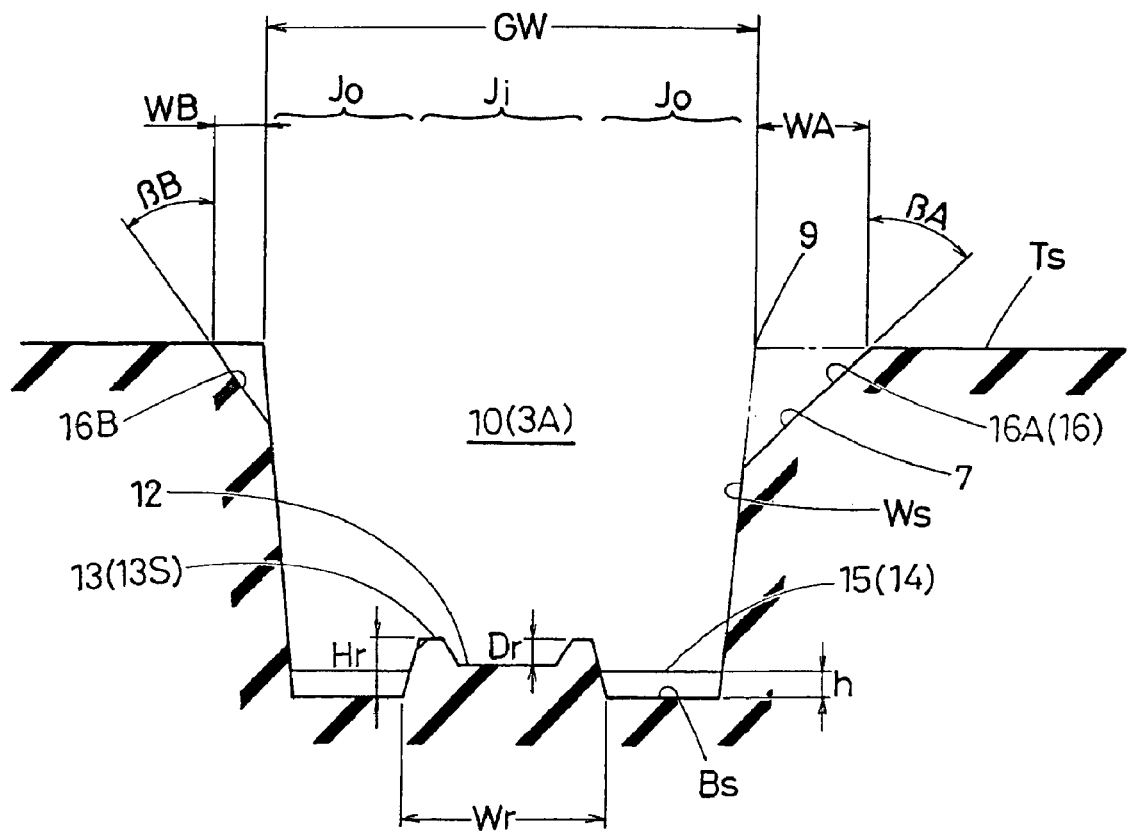
FIG. 3 is a cross sectional view of thereof.

The wide circumferential groove 10 is, as shown in FIGS. 2 and 3, provided in the groove bottom BS with a rib (hereinafter the "groove bottom rib 13", and the groove bottom rib 13 is provided in the top face with a small groove 12.

The groove bottom rib 13 extends along the overall length of the wide circumferential groove 10. In this example, the groove bottom rib 13 is located on the center line of the groove bottom Bs. Thus, the groove bottom rib 13 is straight.

The height Hr of the groove bottom rib 13 measured from the groove bottom Bs to the top face 13s is in a range of from 0.5 to 3.0 mm preferably 1.0 to 2.0 mm. The base width Wr of the groove bottom rib 13 measured at the groove bottom Bs is in a range of from 10 to 30% of the groove width GW. The base width Wr is more than the height Hr.

The sectional shape of the groove bottom rib 13 is substantially a trapezoid or a rectangle.

Such groove bottom rib 13 makes a shallow part Ji on the groove bottom rib 13 and a deep part jo on each side thereof in the wide circumferential groove 10. Owing to the shallow part Ji and deep parts jo, a multi-mode resonance becomes liable to occur in the air tube, in which the modes connecting with the parts Ji and Jo interfere with each other. By the groove bottom rib 13, air flow and sonic flow from the lateral main grooves 4 are hindered and they are diffused in the wide circumferential groove 10. Therefore, the occurrence of air tube resonance can be controlled. If the rib base width Wr is less than 10% or more than 30% of the groove width GW, then the effect of mode interference between the parts Ji and Jo decreases and the air tube resonance can not be fully controlled. If the rib height Hr is less than 0.5 mm, then not only the mode interference effect but also the diffusion effect decrease, and it becomes difficult to control the air tube resonance. If the rib height Hr is more than 3.0 mm, it decreases the drainage by the wide circumferential groove 10 and wet performance deteriorates.

The above-mentioned small groove 12 is disposed in the top face 13s of the groove bottom rib 13. The small groove 12 extends continuously in the tire circumferential direction. The depth Dr thereof is less than the rib height Hr, preferably in a range of from 30 to 60% of the rib height Hr. If the depth Dr is less than 30% of the rib height Hr, then wet performance is liable to decrease. If the depth Dr is more than 60%, then the effect to control air tube resonance is decreased. In this embodiment, the sectional shape of the small groove 12 is a trapezoid being long from side to side. But, a rectangle being long from side to side, a semicircle, and the like may be also used.

Figure 4:
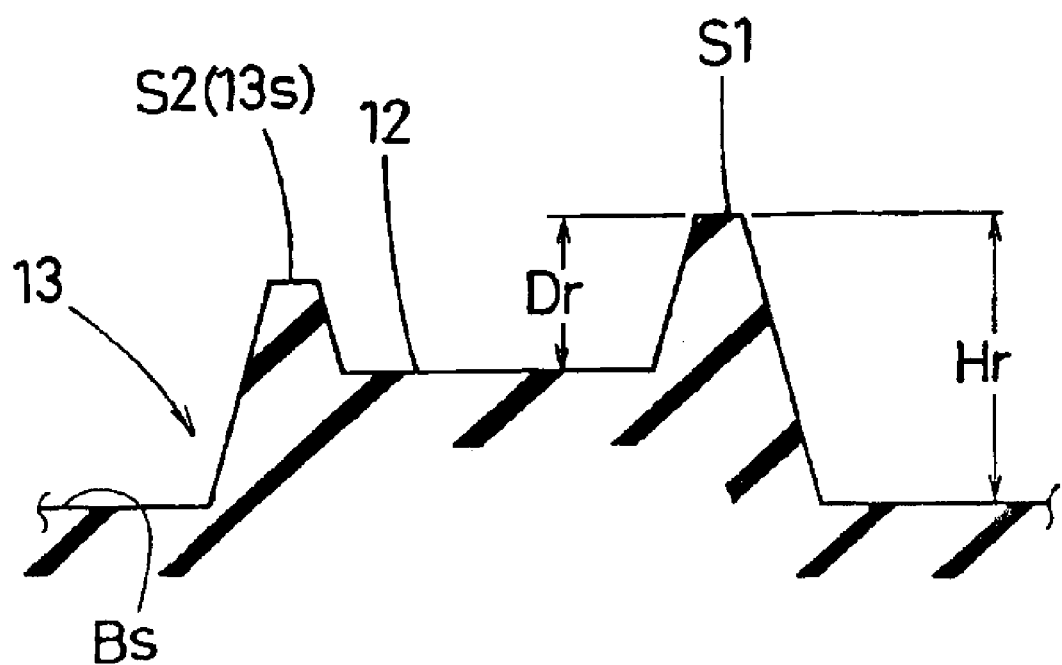
FIG. 4 is an enlarged cross sectional view of another example of the groove bottom rib.

FIG. 4 shows a modification of the groove bottom rib 13, wherein the groove bottom rib 13 differs in height between parts S1 and S2 of the top face between which the small groove 12 is positioned. It is preferable that the higher part S1 is disposed on the tire equator side. In this case, the above-mentioned rib height Hr is defined by the higher part S1. The depth Dr is defined as from the higher part S1.

As the ground pressure is higher in the tread center, the air flowing from the lateral main grooves 5A and 5B on the tire equator C side becomes greater than that from the lateral main grooves 4 on the other side. Accordingly, by increasing the height of the part S1 on the tire equator C side, the diffusion effect is promoted and the air tube resonance can be effectively controlled.

In order to further suppress air tube resonance in the wide circumferential groove 10, two parts Bs1 and Bs2 of the groove bottom divided by the groove bottom rib 13 are provided with knurled parts 14.

Figure 5:
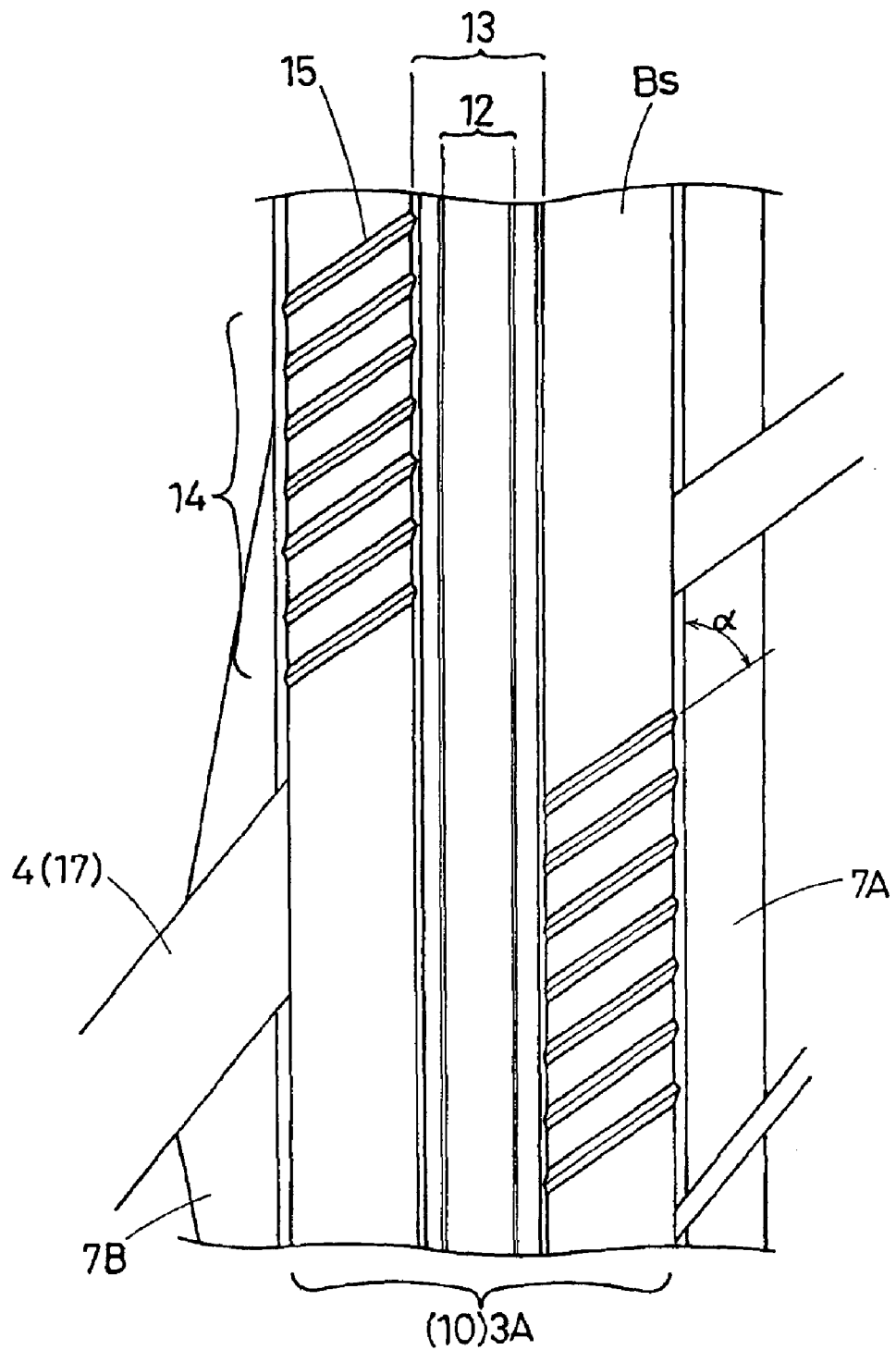
FIG. 5 is an enlarged plan view of the wide circumferential groove showing the knurled parts.

The knurled part 14 is, as shown in FIG. 5 and FIG. 2, collectively formed by a plurality of parallel small ribs 15 which are inclined at an angle α of 20 to 70 degrees with respect to the longitudinal direction of the wide groove 10 or the circumferential direction.

It is preferable for drainage that the height (h) of the small ribs 15 is less than the height Hr of the groove bottom rib 13. For the sectional shape of the small rib 15, not only a triangle as shown in FIG. 2 but also a rectangle, a semicircle and the like may be used.

The knurled parts 14 are staggered between the groove bottom parts Bs1 and Bs2 to promote the occurrence of multi-modes which are different in the circumferential positions of the nodes.

As to the number of the knurled parts 14 in each of the groove bottom parts Bs1 and Bs2, at lest one knurled part 14 always exists in the foot print of the tire during running. In other words, the knurled parts 14 in each of the groove bottom parts Bs1 and Bs2 are disposed at circumferential pitches P which are less than the ground contacting length, preferably in the range of from 30 to 50% of the ground contacting length. Here, the ground contacting length is a circumferential length of the foot print measured at the axial position of the knurled parts 14.

The corners 9 between the groove walls Ws of the wide circumferential groove 10 and the tread face Ts may be formed as an angled corner as shown in FIG. 3 by an imaginary line, but it is preferable that at least one of the corners 9 is chamfered. In this example, each corner is chamfered by a down slope 16A, 16B as shown in FIGS. 2 and 3.

In the tire meridian section, the down slopes 16A and 16B are straight. The slope 16A of angle βA on the tire equator side is gentler than the slope 16B of angle βB on the tread edge side. The angle βA and angle βB are set in a range of from 40 to 70 degrees with respect to the normal to the tread face Ts.

In this example, the gentle slope 16A on the tire equator side has a substantially constant axial width WA. But, the slope 16B on the other side has a variable axial width WB. The width WB decreases from each of slits 17 and the lateral main grooves 4 toward each side thereof. As the width WB is changed repeatedly in the tire circumferential direction, air flow and sonic flow in the wide circumferential groove 10 can be diffused, and the air tube resonance is further suppressed.

When the chamfer is provided, the above-mentioned groove width GW may be defined, based on the original corner 9 which is the intersection of extensions of the groove wall Ws and tread face Ts as shown in FIG. 3

The lateral main grooves 4 and slits 17 are alternately disposed in the circumferential direction. Although the lateral main grooves 4 extend from the wide circumferential groove 10 to the circumferential groove 3B, the slits 17 extend from the wide circumferential groove 10 but terminate in the adjacent tread blocks.

The tread portion is further, provided with sipes 23. The sipe is a very fine groove having a width of about 1 mm or less inclusive of a cut having no substantial width.

Comparison Tests

Radial tires of size 205/65R15 (Rim size 15×6.5JJ) for recreational vehicles were made and tested for the road noise performance and wet performance as follows. The test tires had the tread pattern shown in FIG. 1 and the same structure except for the groove bottom rib. The specifications of the groove bottom ribs and test results are shown in Table 1. Other common specifications are as follows:

| | |
|---|---|
| Ground contacting width TW | 170 mm |
| Wide circumferential groove | |
| Width GW | 15 mm |
| GW/TW (%) | 8.8 |
| Depth | 8.2 mm |
| Small groove | |
| Depth Dr | 0.5 mm |
| Dr/Hr (%) | 50 |
| Knurled part | |
| Height h | 0.4 mm |

1) Road Noise Performance Test:

A seven-seater FF-type minivan provided on all the four wheels with test tires was coasted on a smooth asphalt road at a speed of 50 km/hr, and the sound pressure level dB(A) of the overall noise was measured near the driver's inside ear. (Tire pressure 230 kPa)

The results are indicated in Table 1 by an index based on "conv." being 100, wherein the higher the index number, the better the road noise.

2) Wet Performance Test:

The above-mentioned minivan was run on an asphalt-paved 100-meter-radius wet test course provided with a 20 meter long 10 millimeter depth water pool, and the lateral acceleration was measured when the minivan entered the water pool at a speed of 80 km/hr.

The results are indicated in Table 1 by an index based on "Conv." being 100, wherein the higher the index number, the better the wet performance.

The present invention can be suitably applied to pneumatic tires having a wide circumferential groove in addition to a radial tire for recreational vehicles.

What is claimed is:

1. A pneumatic tire comprising
a tread portion provided with at least one wide circumferential groove,
the wide circumferential groove extending continuously in the tire circumferential direction and having a groove width GW of not less than 5% of the ground contacting width TW,
the wide circumferential groove provided in the groove bottom with a groove bottom rib,
the groove bottom rib extending continuously along the overall length of the wide circumferential groove,
the groove bottom rib having a height Hr in a range of from 0.5 to 3.0 mm and a base width Wr in a range of from 10 to 30% of the groove width GW, and
the groove bottom rib provided in the top face with a single small groove having a depth Dr of less than the height Hr, wherein
the groove bottom of the wide circumferential groove is provided on each side of the groove bottom rib with knurled parts intermittently disposed in the longitudinal direction of the wide circumferential groove,
and the knurled parts are each made up of small ribs extending crosswise to the longitudinal direction of the wide circumferential groove, wherein the knurled parts are provided only on said groove bottom.

2. A pneumatic tire according to claim 1, wherein the depth Dr of the small groove is in a rage of from 30 to 60% of the rib height Hr.

3. A pneumatic tire according to claim 1, wherein the wide circumferential groove is provided on at least one of the edges with a down slope towards the groove bottom.

4. A pneumatic tire according to claim 1, wherein said at last one wide circumferential groove is only one wide circumferential groove disposed within a half tread portion on one side of the tire equator.

5. A pneumatic tire according to claim 1, wherein the top face of the groove bottom rib is provided only with said small groove.

6. A pneumatic tire according to claim 1, wherein said small ribs are inclined at an angle of 20 to 70 degrees with respect to the longitudinal direction of the wide groove.

TABLE 1

| Tire | Conv. | Ex. 1A | Ex. 1B | Ex. 1C | Ref. 1A | Ex. 2A | Ex. 2B | Ex. 2C | Ref. 2A | Ex. 3A | Ex. 3B | Ex. 3C | Ref. 3A | Ex. 4A | Ex. 4B |
|---|---|---|---|---|---|---|---|---|---|---|---|---|---|---|---|
| Groove bottom rib | none | | | | | | | | | | | | | | |
| Height Hr | 0 | 0.5 | 0.5 | 0.5 | 0.5 | 1 | 1 | 1 | 1 | 1.5 | 1.5 | 1.5 | 1.5 | 2 | 2 |
| Base width Wr | 0 | 1.5 | 3 | 4.5 | 6 | 1.5 | 3 | 4.5 | 6 | 1.5 | 3 | 4.5 | 6 | 1.5 | 3 |
| Wr/GW (%) | — | 10 | 20 | 30 | 40 | 10 | 20 | 30 | 40 | 10 | 20 | 30 | 40 | 10 | 20 |
| Road noise | 100 | 102 | 103 | 103 | 95 | 103 | 104 | 105 | 95 | 105 | 106 | 107 | 100 | 108 | 108 |
| Wet performance | 100 | 100 | 100 | 100 | 95 | 100 | 100 | 99 | 93 | 97 | 97 | 95 | 90 | 90 | 89 |

| Tire | Conv. | Ex. 4C | Ref. 4A | Ex. 5A | Ex. 5B | Ex. 5C | Ref. 5A | Ex. 6A | Ex. 6B | Ex. 6C | Ref. 6A | Ex. 7A | Ex. 7B | Ex. 7C | Ref. 7A |
|---|---|---|---|---|---|---|---|---|---|---|---|---|---|---|---|
| Groove bottom rib | none | | | | | | | | | | | | | | |
| Height Hr | 0 | 2 | 2 | 2.5 | 2.5 | 2.5 | 2.5 | 3 | 3 | 3 | 3 | 3.5 | 3.5 | 3.5 | 3.5 |
| Base width Wr | 0 | 4.5 | 6 | 1.5 | 3 | 4.5 | 6 | 1.5 | 3 | 4.5 | 6 | 1.5 | 3 | 4.5 | 6 |
| Wr/GW (%) | — | 30 | 40 | 10 | 20 | 30 | 40 | 10 | 20 | 30 | 40 | 10 | 20 | 30 | 40 |
| Road noise | 100 | 109 | 102 | 110 | 110 | 112 | 103 | 112 | 113 | 113 | 104 | 114 | 115 | 116 | 104 |
| Wet performance | 100 | 87 | 85 | 87 | 86 | 85 | 80 | 85 | 84 | 83 | 80 | 75 | 73 | 72 | 68 |

7. A pneumatic tire according to claim 1, wherein said small ribs are lower in height than the groove bottom rib.

8. A pneumatic tire according to claim 1, wherein said small ribs are parallel each other.

9. A pneumatic tire according to claim 1, wherein the knurled parts are staggered along the groove bottom rib.

10. A pneumatic tire according to claim 1, wherein on each side of the groove bottom rib, the knurled parts are disposed at circumferential pitches P less than a ground contacting length.

11. A pneumatic tire according to claim 10, wherein the circumferential pitches P are in the range of from 30 to 50% of the ground contacting length.

12. A pneumatic tire according to claim 1, wherein the number of the knurled parts on each side of the groove bottom rib is such that at least one knurled part is always present in a foot print of the tire during running.

13. A pneumatic tire according to claim 1, wherein said tread portion is provided with lateral grooves connected to the wide circumferential groove.

14. A pneumatic tire according to claim 13, wherein in the portions at which the wide circumferential groove is connected with the lateral grooves, the knurled parts are not provided, and the knurled parts are formed between the lateral grooves.

15. A pneumatic tire according to claim 1, wherein on each side of the groove bottom rib, only said small ribs are provided.

16. A pneumatic tire according to claim 1, wherein the bottom of said small groove on the top of the groove bottom rib has a flat bottom.

* * * * *